Jan. 4, 1949. J. S. WINKLER 2,458,125
AUTO GLARE SHIELD
Filed July 10, 1947
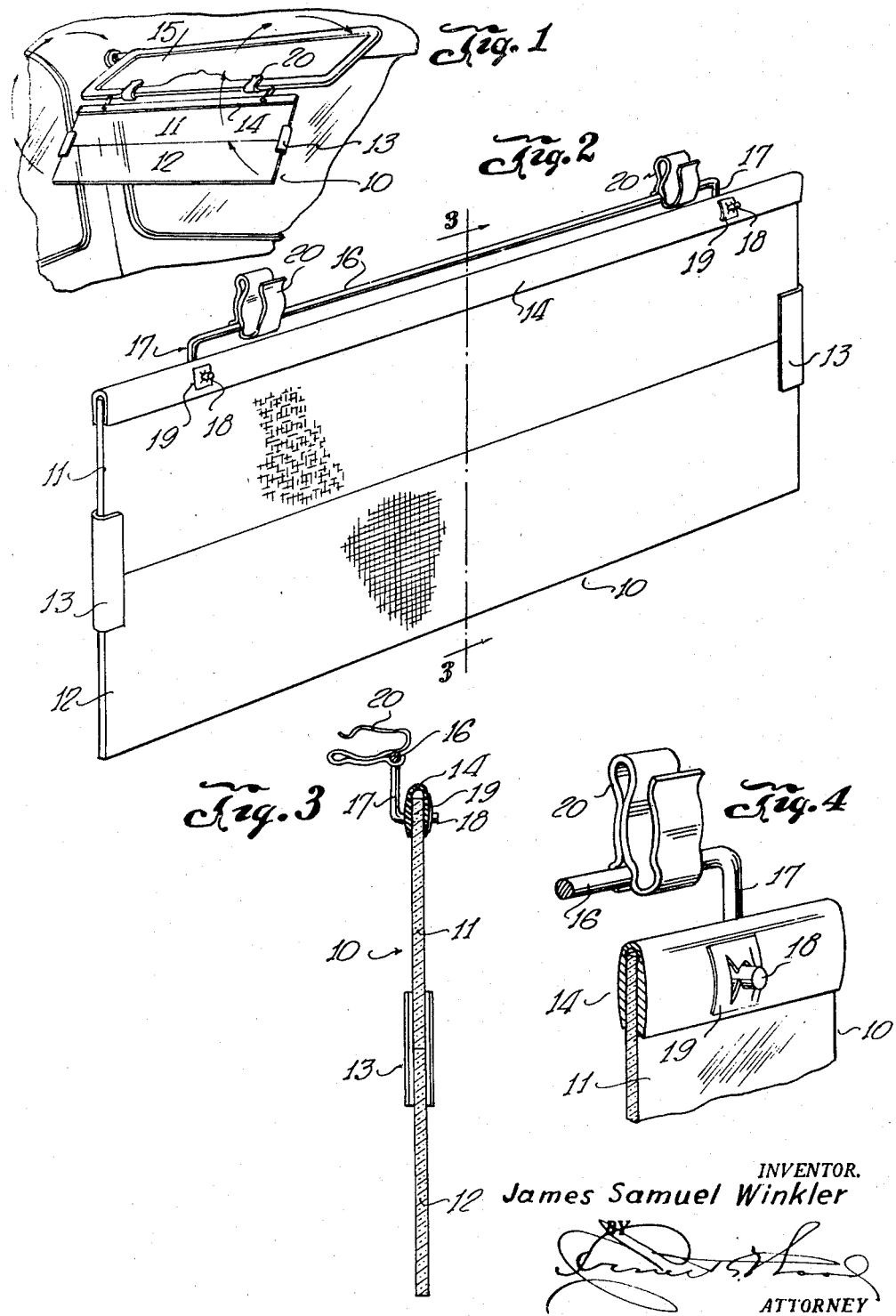

Patented Jan. 4, 1949

2,458,125

UNITED STATES PATENT OFFICE 2,458,125

AUTO GLARE SHIELD

James Samuel Winkler, Los Angeles, Calif., assignor to Max Shayne, Los Angeles, Calif.

Application July 10, 1947, Serial No. 759,939

2 Claims. (Cl. 296—97)

This invention relates to glare shields for automobiles and more particularly to a dual tint glare shield and a mounting therefor.

The principal object of the invention is to provide a glare shield whose mounting is especially designed and constructed for ready attachment to the conventional opaque visor and capable of foldability in relation thereto when not in use. The invention further provides a glare shield having a field divided horizontally into two colors or tints, one suitable for day-time driving while the other shields the eyes against the glare of headlights of approaching vehicles.

Another object of the invention is to provide a glare shield whose tinted sections are in the same plane and whose line of separation is imperceptible and therefore presents no obstruction to vision.

With the foregoing objects in view, the invention has further reference to certain features of accomplishment which will become apparent as the description proceeds, taken in connection with the accompanying drawing wherein:

Figure 1 is a fragmentary view of the interior of an automobile showing the invention mounted on the conventional visor thereof.

Figure 2 is a perspective view of the invention per se.

Figure 3 is a vertical sectional view taken on line 3—3 on Figure 2, and

Figure 4 is a fragmentary perspective view of the glare shield and mounting showing the form of clamp employed to secure the mounting on a visor.

Continuing with a more detailed description of the drawing, reference numeral 10 denotes the glare shield generally which is composed of two parallel sections 11 and 12 of differently tinted, transparent plastic material. It is preferred that the upper section 11 be tinted yellow or a similar shade while the companion section is preferably smoky green. In any case, the colors are such as to be restful for the eyes in both day and night driving.

The sections 11 and 12, are joined together at their ends by clips 13. Along the upper edge of the upper section 11 is mounted a binding strip 14 to which is attached the mounting for the glare shield.

The invention seeks to avoid as much as possible the use of materials which lend weight to the shield since it is designed for attachment to the conventional visor and is required, in operation to be suspended from the visor while the latter is in raised position, in which position it is held by friction. This is borne out in Figure 1 which shows the operative position of the glare shield.

To mount the glare shield on the conventional visor 15, a rod 16 has its ends 17 bent at right angles to its longitudinal axis, thence outwardly at 18 to enter apertures adjacent the ends of the strip 14 at the top of the shield. Retaining clips 19 are pressed onto the protruding ends 18 of the mounting rod 16 to hold the shield thereon.

Secured to the rod 16 adjacent the right angle bends therein are clamps 20 made of spring steel in substantially S-shape, as shown. Generally speaking, the conventional visors 15 are reinforced about the edges by means of a metal frame which presents a ridge adjacent the perimeter thereof. The clamp 20 is so formed that it will engage this ridge and will thus be held in place on the visor.

In using the shield, the visor 15 to which it is attached, is moved to the inoperative position shown in Figure 1 and the shield 10 is adjusted to a position at substantially right angles thereto or to the line of vision of the motorist.

When not in use, the shield 10 is folded onto the top of the visor 15, as suggested by the arrows in Figure 1, after which, the visor is pushed upwardly against the top of the vehicle, to be so held by the friction clamp of its own mounting.

Manifestly, the construction as shown and described is capable of some modification and such modification as may be construed to fall within the scope and meaning of the appended claims is also considered to be within the spirit and intent of the invention.

What is claimed is:

1. A glare shield in two transparent and parallel sections of different color secured together at their ends, the upper of said sections having a mounting strip affixed to its upper edge, a rod parallel with said mounting strip whose ends are formed to provide projections below and at right angles thereto and entering apertures in and adjacent the ends of said mounting strip, clips frictionally embracing the projections of said rod and holding said mounting strip thereon and clamping means in spaced relationship on said rod for attaching said shield to the visor of an automobile.

2. As a new article of manufacture, a glare shield adapted for attachment to the visor of an automobile comprising two sheets of substantially rectangular transparent plastic material of different color joined together coextensively in edge to edge parallelism, a mounting strip affixed to and coextensive with the top edge of the upper of said sheets, a rod extending parallel with and partially the length of said upper sheet, whose ends are bent downwardly and at right angles to the longitudinal axis thereof to enter apertures in said mounting strip and clamping means in spaced apart relationship on said rod for securing said shield to said visor.

JAMES SAMUEL WINKLER.

REFERENCES CITED

The following references are of record in the file of this patent:

UNITED STATES PATENTS

| Number | Name | Date |
| --- | --- | --- |
| 2,020,585 | Stansberry | Nov. 12, 1935 |
| 2,239,158 | McCloud | Apr. 22, 1941 |
| 2,257,612 | Lininger | Sept. 30, 1941 |